May 6, 1969  H. WALKER  3,442,257
SLIDING PIVOTED PISTON ROTARY ENGINE
Filed March 7, 1967  Sheet 1 of 8

FIG.1

INVENTOR
HAMILTON WALKER
By Young & Thompson
ATTYS.

United States Patent Office 3,442,257
Patented May 6, 1969

3,442,257
SLIDING PIVOTED PISTON ROTARY ENGINE
Hamilton Walker, 24 Kiripaka Road, Whangarei,
North Island, New Zealand
Filed Mar. 7, 1967, Ser. No. 621,183
Claims priority, application New Zealand, Mar. 15, 1966,
144,495
Int. Cl. F02b 55/02, 55/08; F01c 1/04
U.S. Cl. 123—17                                    11 Claims

ABSTRACT OF THE DISCLOSURE

An improved rotary internal combustion engine comprising a stator having an intake port and an exhaust port, a rotor disposed in the stator so as to be capable of rotation about a central axis, the rotor including at least one arm, the or each arm pivoting a substantially rectangular or square shaped piston and the inside contour of the stator shaped so that both ends of the or each piston follow the contour evenly to provide a chamber between the stator and the piston, and a firing means positioned in the stator whereby in a turning of the rotor, fuel mixture is introduced at the intake port and confined in the said chamber between the stator and the piston so that on reaching the firing means the fuel mixture is ignited, the combusted gases force the piston past the exhaust port through which the combusted gases are discharged.

---

This invention relates to rotary internal combustion engines or the like and has for its main object to provide an improved rotary internal combustion engine having a novel construction and/or arrangement of its parts resulting in a more efficient engine than one known hitherto.

Broadly the invention consists of an improved rotary internal combustion engine comprising a stator having an intake port and an exhaust port, a rotor disposed in the stator so as to be capable of rotation about a central axis, the rotor including at least one arm, the or each arm pivoting a substantially rectangular or square shaped piston and the inside contour of the stator shaped so that both ends of the or each piston follow the contour evenly to provide a chamber between the stator and the piston and a firing means positioned in the stator whereby in a turning of the rotor, fuel mixture is introduced at the intake port and confined in the said chamber between the stator and the piston so that on reaching the firing means the fuel mixture is ignited, the combusted gases force the piston past the exhaust port through which the combusted gases are discharged.

In further describing the invention reference will be made hereinafter to the accompanying drawings in which:

FIGURE 1 is a cross-sectional end view,
FIGURE 5 is an end view,
and
FIGURE 6 is a side view of a main end seal of a piston;
FIGURE 7 is an inverted plan,
FIGURE 8 is a side view,
and
FIGURE 9 is a cross-sectional view of a subseal of a main end seal;
FIGURE 10 is a detail cross-sectional view showing an impulse and alternate rotary valve air feed;
FIGURE 11 is a detail cross-sectional view showing an exhaust bypass feed.

Figure 1:
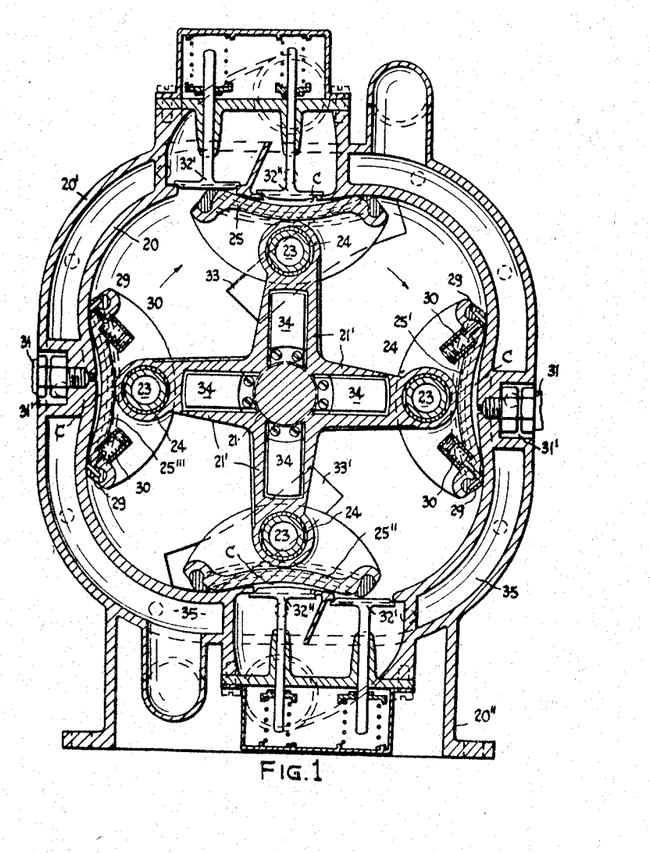
Figure 2:
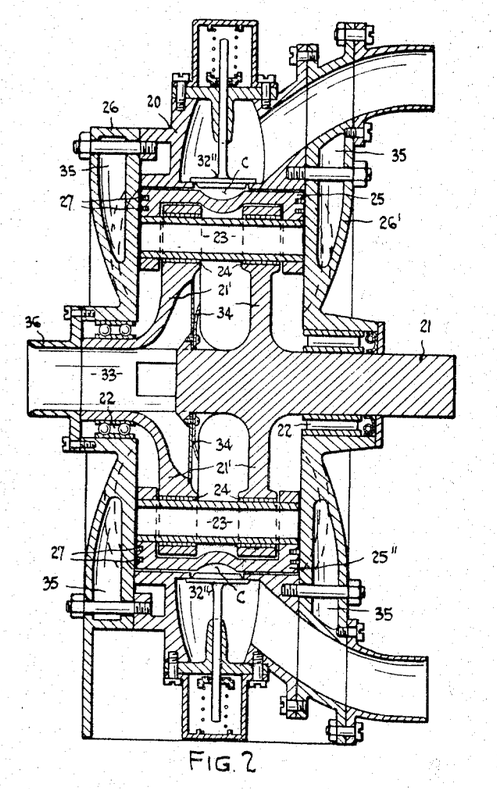
FIGURE 2 is a cross-sectional side view of a first form of the engine.

In further describing the engine in its first form with four pistons, as in FIGURES 1 and 2, the stator casing 20 is of a regular shape having an internal contour formed with at least four recessed concave portions or arcs alternating with at least four convex portions or arcs merging with one another. Geometrical representations of stator contours will be referred to later. The rotor shaft 21 has four radial arms 21' journalled in bearings 22. In each arm 21' a gudgeon pin 23 is journalled in a bearing 24. The gudgeon pin bearings are eccentric so that the piston can be adjusted in distance from the shaft, so they will have the correct clearance and also after any wear the piston clearance can be again reset correctly. For purpose of clarity, the bearings are not shown as eccentric in the drawings. These gudgeon pins carry the respective pistons 25, 25', 25'' and 25''' which are of a somewhat flat elliptical shape, presenting an outer side which always provides a chamber C between it and the stator casing 20. Each piston 25 is of a rectangular or square shape, that is in plan, with straight sides and ends.

The pistons 25 therefore extend between the inside surface of a front plate 26 and a rear plate 26' of the stator in the one direction and in the other direction its length is such as to provide the chamber C with the contour of the stator casing's inside surface. In order to provide effective closure there are side seals 27 of a flat U-section which can be loaded by wave springs (not shown); and the main seals 29 loaded by springs 30. These are located in the leading and following ends of the pistons. To give effective sealing when the engine is cold there are subseals 29' in the ends of the main seals 29 and they are also loaded by springs 30' (see FIGURE 5). The back of each main seal is in a bearing area of 250° and this allows the sealing area near front of seal to follow the contour of the stator at high speed; total seal movement in the bearing is about 0.001'' approximately. The forward end of the seal is spring loaded. The contact point for sealing moves around on the seal arc as the pistons revolve. The front end of the seal on the inner side, away from the stator, has a compensating pressure area, to keep the seal the firmest when it needs the best sealing.

The subseals in the ends of the main seals are spring loaded and give efficient end of seal sealing, when cold and at low speeds. The main seals are therefore of the pivoting type.

The firing means consist of glow or spark plugs 31 in positions 31' at the opposite sides of the stator casing. The sparking plugs can be set in the front plate 26 or where two plugs are used the second one is in the rear plate 26'.

Figures 5, 6, 7, 8, 9, 10, 11:
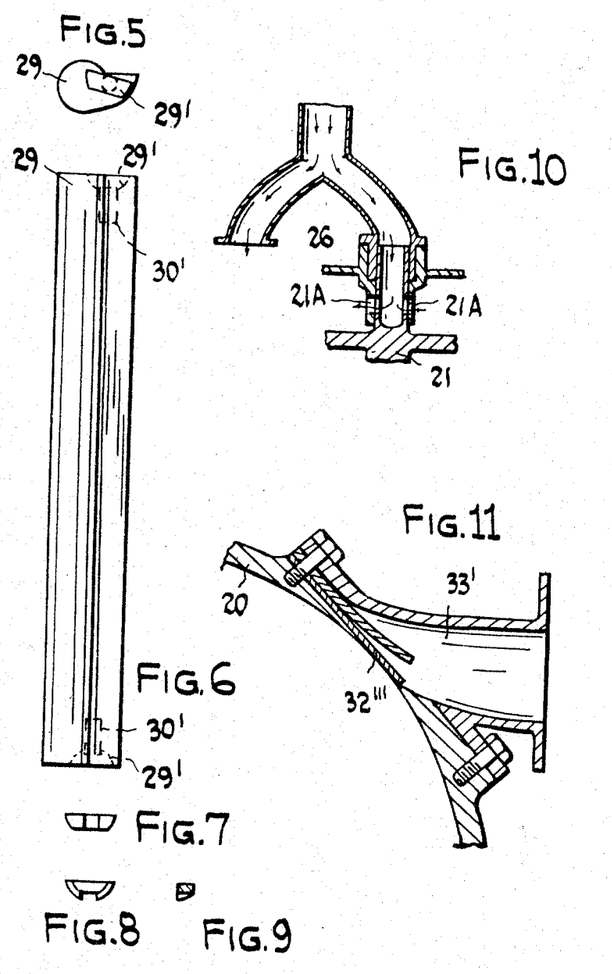

At other opposing sides of the stator casing there are the exhaust bypass valves 32' and 32'', set in line of rotor movement connecting to an exhaust manifold, or as alternative reeds 32''' as in FIGURE 11, to create two ⅜'' suction lines for exhaust gas bypass, and to allow suction to be created in the stator.

The intake is provided by a channel 33 extending in through the rotor shaft 21 with reeds 34 and side bypass channels 33' located just after the exhaust bypass valves or reeds.

Cooling is provided by water circulating in a cooling chamber 35 provided by an arrangement of the stator casing 20 and an outer casing 20'. 36 is the end of a carburetor and 20'' the base of engine. Incoming air is divided for part to go to the carburetor and the other part into the stator for cooling purposes and then through rotary ports 21A in the tubular channel 33 of the main shaft 21, in some types. Ultimately the air leaves the stator housing through the exhaust ports. As an alternative to the rotary ports 21A can be used instead of reeds for fuel mixture. Other parts will now be referred to with the following cycle. In operation the leading and following ends of the pistons follow the contour of the inside of the stator casing.

In the form of the engine as shown in FIGURES 1 and 2 starting with the pistons 25 and 25″ in horizontal positions 0° and 180°, the scavenging cycle is just finishing and as the pistons move forward the fuel mixture which has just been sucked into the stator housing 20 by the four pistons will now start to be compressed by the inside of the four pistons, and as the channels 33′ become exposed into the piston chambers C that are increasing in capacity in pistons 25 and 25″ the fuel mixture will be forced into them, the mixture being supercharged by the four pistons.

At 50° approximately of travel the rear of the pistons pass the end of the bypass channels 33′ and the two piston chamber C will contain most of the fuel mixture that was sucked into the stator housing 20 by the four pistons.

The compression stroke is now progressing and at 90° of travel the glow or spark plugs 31 have ignited the compressed mixture and the power strokes are taking place. After approximately 40° of further travel the exhaust automatic bypass valves 32′, 32″ or reeds 32‴ are exposed and the exhaust cycles begin. This cycle continues till 180° has been covered by these two pistons and then the four cycles, intake, compression, power and exhaust are complete and piston 25″ is now in the position from where the piston 25 started. These two pistons then repeat the four cycles to complete a revolution. The other two pistons 25′ and 25″, starting on the power stroke at the same time, go also through the four cycles, twice in the one revolution. This means for the four pistons, eight power strokes per revolutions, equal to a sixteen-cylinder, four-stroke conventional engine. As the four pistons only cover half the area of the inside of the contour of the stator 20 at one time the exposed 50% is available for cooling. This gives excellent cooling to the combustion area, the spark plug points and the exhaust bypass valves or reeds. When the four pistons are in the position shown in FIGURE 1 the inner area is at its maximum and on the piston moving forward 45° the capacity is reduced to the minimum. The four pistons suck in the capacity of the four of them and then supercharge it into two pistons, the other two pistons being on the power stroke.

Figure 3:
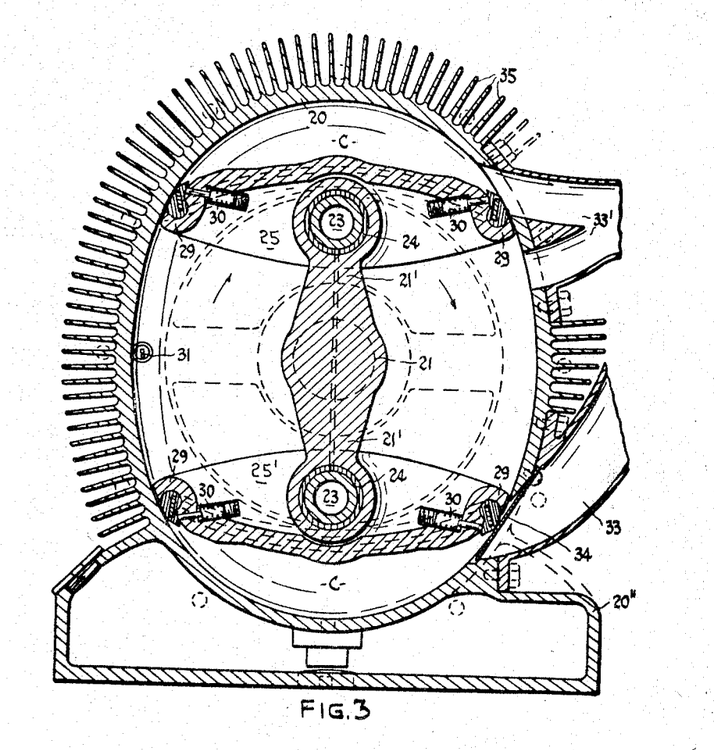
FIGURE 3 is a cross-sectional end view and
FIGURE 4 is a cross-sectional side view of a second form of the engine.
Figure 4:
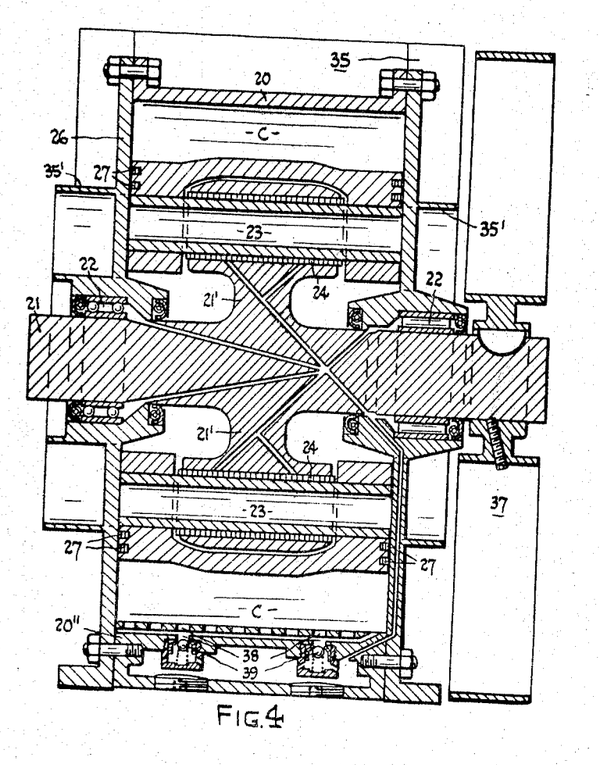

In the second and elliptical form of the engine as shown in FIGURES 3 and 4 its casing 20 is of an elliptical shape in cross section and at one side, has an intake manifold (not shown) near the casing's lower end with its intake port or channel 33 connecting to the inside of the stator. A valve or reed 34 can be located at the intake port to control amount of opening. At the same side near the casing's upper end is the exhaust port or channel 33′ connecting with an exhaust manifold 33″.

The rotor has its shaft 21 extending through the centre of the stator casing 20 and journalled in antifriction bearings 22 positioned in the front plate 26 and the back plate 26′ respectively of the stator casing. From this rotor shaft 21 extend diametrically opposite the arms 21′ and in the outer end of each arm, its gudgeon pin 23 is journalled in a bearing 24. This gudgeon pin 23 carries the respective piston 25 or 25″ which can be of a somewhat flat elliptical shape presenting an outer side which always provides the chamber C between it and the inside surface of the stator casing 20, but the leading and following ends always running or wiping on the internal surface of the casing. As previously stated each piston is of a rectangular or square shape that is in plan with straight sides and ends. The piston therefore extends between the inside surfaces of the stator casing's front and back plates 26, 26′ in one direction and in the other direction its length is such to provide the chamber C with the inside contour of the stator casing. In order to provide effective closure there are the side seals 27 and the seals 29 loaded by the springs 30 located in the leading and following ends of the piston.

The firing means consists of one sparking plug 31 positioned centrally in the side of the stator casing 20 opposite that having the intake and exhaust ports 33, 33′ and so that it is in line of the moving chamber C between the respective piston and the stator casing's inside surface.

Provision is also made for cooling the engine by cooling fins 35′ located around the stator casing 20 and/or the rotor shaft 21 can be extended to act as a drive shaft for an air fan 37 connected to drive air through a passage in the stator casing and out therefrom. The engine base 20″ is preferably to include an oil sump connectable to the bottom of the stator by oil collection holes and channels 38 controlled by spring-loaded ball valves 39. In the elliptical form if the collection holes and ball valves were built in nearer the intake reeds, the pressure would be lower, if they were built in nearer the combustion area, the compression would be higher, and so would the oil pressure.

In this elliptical form of engine where there is only one firing area per revolution for each piston the operation is as follows:

The top piston 25 has just finished its power stroke =0° and then after travelling clockwise for 90° to 100° the scavenging stroke or cycle is finished and the intake reeds 34 start to open with the suction of the intake stroke, the fuel mixture flowing in through an intake manifold and past the reeds 34 coming from the carburettor 36 or fuel mixture device, will go into the increasing capacity chamber C made by the piston and the stator.

After a further travel of 90° approximately the rear end piston seals, moves along the reed, making it close positively. At this period the economy channels 33″ are open and are shown in FIGURE 3 for clarity. As the piston passes the end of the economy channels the compression stroke is started.

After moving 270° the piston will have the mixture fully compressed and the mixture will have been ignited so that the power cycle is started. The piston continues the power cycle to approximately 250° and the exhaust ports then become exposed and the exhaust cycle starts.

The four cycles are complete in the one revolution for each piston. The two power strokes per revolution equal a four-cylinder four-stroke conventional engine. The elliptical engine also has the combustion area, plug and ports cooled alternately or half the time.

Where provision is made, for two intake areas, two compression areas, two combustion areas, and two scavenging areas opposite each other, from two to six pistons can be used. When there are three combustion areas provided, give the repeat of the four cycles, three times per revolution, from three to nine pistons can be used. In the small elliptical-shaped stator where only one firing area is provided and there are the four cycles per revolution from one to three pistons can be used.

When the pistons suck air in as shown in FIGURE 10 and the rotor shaft ports 21A close the pistons, two in FIGURE 3, four in FIGURE 1, and six in the third form compress the air slightly and it feeds out through the exhaust ports in all three forms the air capacity is twice the full capacity of the engine at all speeds, this air with the economy system giving smog elimination.

When a standard size of the engine is operating on part throttle say ⅛″ the compression is approximately 2:1 with a thermal efficiency of 24%, if the compression can be kept up at low throttle or power use, as it is in a diesel the economy can be increased from 24% at ⅛″ throttle to 60% and save the waste of fuel (smog creative). In all the three forms it can be done as explained in the operation of the elliptical form. On low throttle use, at the end of the intake stroke, there is still a strong suction and by allowing the air to flow in at the very end of the intake period, the air will follow after the fuel mixture, fill up the following end of the chamber, as the piston moves quickly forward and the compression starts immediately, there will be no mixing to speak of, there are not the poor conditions, that there are from this point of view, in a diesel. The results of raising the compression with a block of air will be diesel economy, and smog elimination and when taken in conjunction with the great flow of air as described above through the exhaust poorts.

Figure 12:
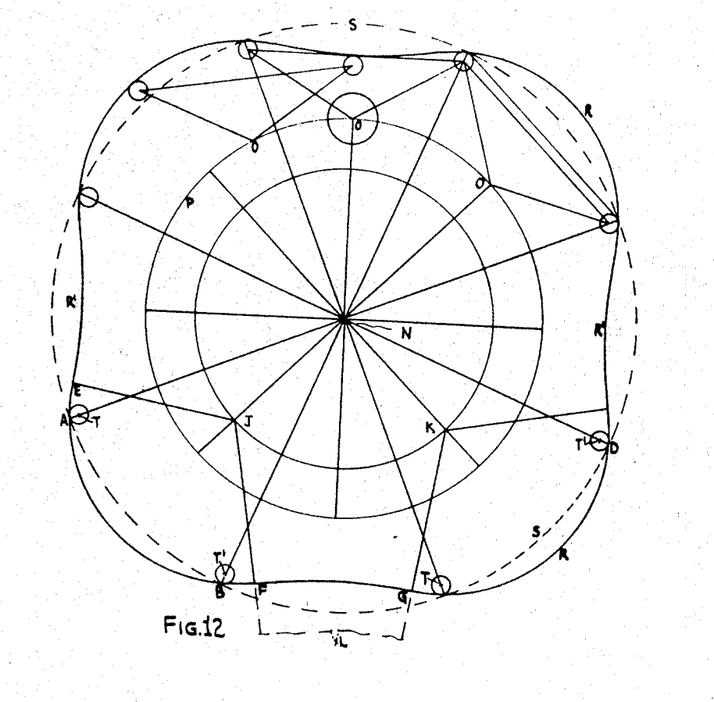
FIGURE 12 is a figure showing geometrically the stator contours of the first form of the engine.

In FIGURE 12, representing a geometrical figure for stator of the first form of the engine, NJ and NK=3", NO=4", JE=3 5/16" radius for arc EF, KG=3 5/16" radius for arc GH, LF=9 15/16" radius for arc FG, AB=4 1/2", TT'=4 11/32", NS=5 7/8"=radius of basic circle, SR=7/16", SR'=5/8", RR'=1 1/16". This is for a 2–6 piston engine.

Figure 13:
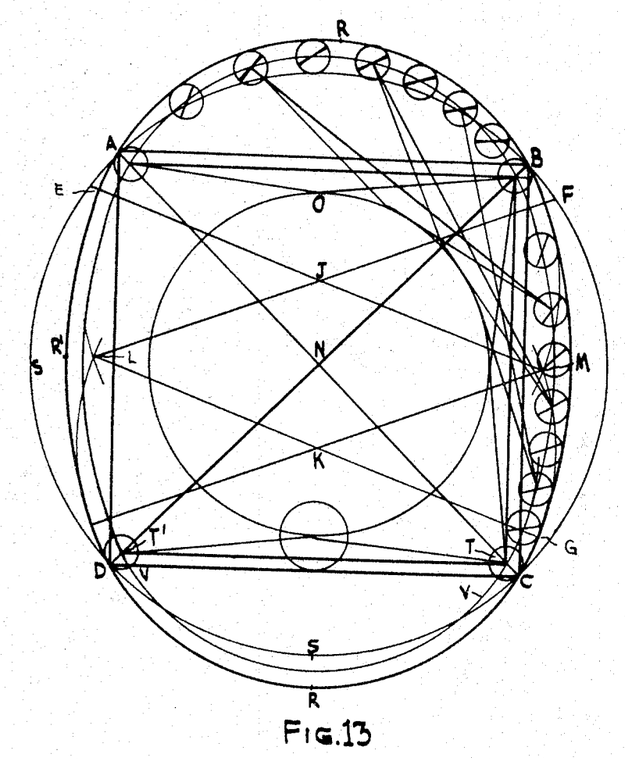
FIGURE 13 is a similar figure to FIGURE 12 showing contours of the second form of the engine.

In FIGURE 13, representing a geometrical figure for stator of the second form of the engine, ABCD is the corners of 6" square, EFGH is sides join top and bottom, J and K=centres for top and bottom arcs, L and M=centres for side arcs, N=centre of crankshaft, O=centre of gudgeon pins, P=gudgeon pin path, R=peripheral surface of stator, S=basic circle, SR=15/32", SR'=17/32", T and T'=centre of 1/4" radius seals, V=planetary track of seal centre, LF=passes over JE=true join, NJ and NK=1 3/16", NO=2 1/2", JE=3 1/2" radius for arc EF, KG=3 1/2" radius for arc GH, LF=7" radius for arc FG, ME=7" radius for arc EH, TT'=5 5/8" centre to centre of seals, OT and OT' must be equal. This is for the 1, 2 or 3/6 piston engine.

Figure 14:
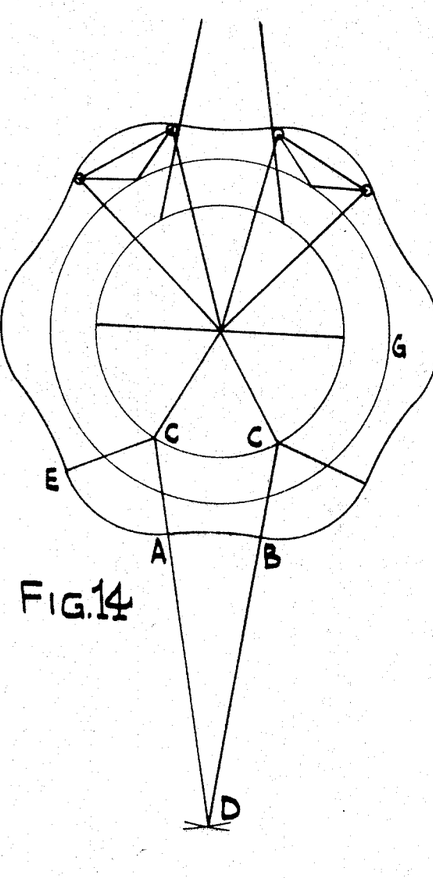
FIGURE 14 is a similar figure to FIGURE 12 showing contours of a third form of the engine.

In FIGURE 14, representing a geometrical figure for stator of the third form of the engine. CA=X, DA=3X, AE=concave arc, AB=convex arc, G=gudgeon pin circle. This is for a 3–9 piston engine.

What is claimed is:

1. A rotary piston internal combustion engine comprising a stator, a rotor with generally radial arms each having a piston pivoted at its outer end, the pistons dividing the volume bounded by the stator into segmental combustion chambers between the inner peripheral surface of the stator and the outermost surfaces of the pistons and into a central fuel induction chamber, said surface of the stator having a constant internal cross-sectional shape with a plurality of equally spaced convex arcs spaced apart by concave arcs, so that as the rotor turns the volumes of the combustion chambers and the fuel induction chamber vary cyclically, means for connecting the central chamber with a source of fuel mixture, valve means in the connecting means, a bypass from the central chamber to a peripheral region of the volume bounded by the stator, the arrangement being such that as the rotor turns, fuel mixture is drawn into the central chamber through the valve means, the valve means closes, the fuel mixture is compressed in that chamber upon said cyclical variation by rotor arm turning and pivoting of its piston, and the compressed mixture is passed through the bypass to a combustion chamber.

2. An engine as claimed in claim 1 in which there are four equally spaced pistons and two by-passes.

3. An engine as claimed in claim 1 in which the valve means is responsive to pressure within the fuel induction chamber.

4. An engine as claimed in claim 3 in which said valve means comprises at least one reed valve.

5. An engine as claimed in claim 1, in which said valve means comprises at least one rotary valve.

6. An engine as claimed in claim 1 in which the pistons are mounted on gudgeon pins which are journalled in eccentric bearings.

7. An engine as claimed in claim 1 in which the edges of the piston for coaction with the stator have seals.

8. An engine as claimed in claim 7 in which each piston has at its leading and following edges a seal that has one edge bearing-bedded so as to allow the other, the sealing edge, to move in an arc, so as to give a smooth continuous contact with the stator at high speed, and the inside of this edge is exposed to the combustion gases, so that the seal will have automatic pressurization for good sealing.

9. An engine as claimed in claim 8, in which, in at least one end of the piston, there are generally half-moon shaped subseals that are spring loaded so that they will make a complete sealing grid by covering the distance not fully covered by the main seals and side seals.

10. An engine as claimed in claim 7, in which the piston has side seals for cooperation with the side walls of the stator said side seals being of U-section and having wave springs disposed inside them and urging the seals into contact with the side walls of the stator.

11. An engine as claimed in claim 4, in which the reed valve is so located that closing of that valve is ensured by the wiping action of the pistons.

References Cited

UNITED STATES PATENTS

| | | | |
|---|---|---|---|
| 3,196,854 | 7/1965 | Novak | 123—8 |
| 3,295,505 | 1/1967 | Jordan | 123—17 |
| 3,339,532 | 9/1967 | Loescher | 123—8 |

ROBERT A. O'LEARY, *Primary Examiner.*

WILLIAM E. WAYNER, *Assistant Examiner.*

U.S. Cl. X.R.

91—142; 123—8